(12) United States Patent  
Terekhova et al.

(10) Patent No.: US 7,583,801 B2  
(45) Date of Patent: Sep. 1, 2009

(54) APPARATUS, SYSTEM, METHOD AND COMPUTER PROGRAM PRODUCT FOR DISTRIBUTING SERVICE INFORMATION AND DIGITAL RIGHTS FOR BROADCAST DATA

(75) Inventors: Karina Terekhova, Helsinki (FI); Toni Paila, Degerby (FI); Larri Vermola, Turku (FI)

(73) Assignee: Nokia Corporation, Espoo (FI)

( * ) Notice: Subject to any disclaimer, the term of this patent is extended or adjusted under 35 U.S.C. 154(b) by 926 days.

(21) Appl. No.: 10/974,817

(22) Filed: Oct. 28, 2004

(65) Prior Publication Data  
US 2005/0094812 A1    May 5, 2005

(30) Foreign Application Priority Data  
Nov. 5, 2003    (GB) .................................. 0325846.4

(51) Int. Cl.  
*H04N 7/167*    (2006.01)  
*H04L 9/00*    (2006.01)  
*H04L 9/32*    (2006.01)

(52) U.S. Cl. ........................ 380/201; 713/168; 713/169; 713/170; 713/171; 713/172; 726/27; 726/28; 726/29; 726/30

(58) Field of Classification Search .................. 380/201  
See application file for complete search history.

(56) References Cited

U.S. PATENT DOCUMENTS

| 7,236,771 | B2 * | 6/2007 | Aaltonen et al. | 455/414.1 |
| 2001/0052856 | A1 * | 12/2001 | Deniau et al. | 340/825.22 |
| 2002/0184643 | A1 * | 12/2002 | Fichet | 725/105 |

FOREIGN PATENT DOCUMENTS

FI    EP 1102465 A2 *    5/2001

* cited by examiner

*Primary Examiner*—Longbit Chai  
(74) *Attorney, Agent, or Firm*—Ditthavong Mori & Steiner, P.C.

(57) ABSTRACT

An apparatus, system method and computer program product configured to transmit data over a broadcast network. The data is encrypted and decoded using a decryption key available to terminals in combination with a digital rights object. A media guide is broadcast to the terminals. Information from the media guide is also stored by a request handling means in order to ensure that information, such as pricing information, broadcast to the terminals is synchronized with information used to register a terminal as a subscriber. A request is sent from a terminal to the broadcast network through a second network. Authentication information identifying the terminal may be included in the request without manual input from a user of the terminal. Authentication information is extracted from a component or added to the message by a component of the second network. The digital rights object is then sent to the terminal via the second network.

55 Claims, 8 Drawing Sheets

APPARATUS, SYSTEM, METHOD AND COMPUTER PROGRAM PRODUCT FOR DISTRIBUTING SERVICE INFORMATION AND DIGITAL RIGHTS FOR BROADCAST DATA

RELATED PATENT APPLICATION

This application claims priority from GB application 0325846.4 filed on Nov. 5, 2003, which is incorporated herein by reference.

FIELD OF INVENTION

The invention relates to distributing service information and/or digital rights relating to broadcast data as well as providing access thereto. The invention also relates to digital broadcast or multicast data distribution through separate sales channels.

BACKGROUND OF INVENTION

Proposed services for mobile terminals, such as news, entertainment or business services, require the transmission of content to one or more receiving devices. The content may include audio, video, multimedia, graphic or other data, such as music files or film clips. In view of the considerable amount of data needed to provide such services, a highly efficient transmission mechanism is required, such as a broadcasting mechanism.

However, a digital broadcast network cannot be used to send messages from a mobile terminal to a service provider, for example, when a user of the terminal wishes to subscribe to a service, discontinue a service, or send a negative acknowledgement notifying a service provider that data packets have not been properly received. This may be overcome by enabling communication between the service provider and mobile terminal over a second network, such as a cellular telecommunications network. Additionally, while the use of a broadcasting mechanism is efficient, it may be desirable to restrict access to content to users who have registered with and/or paid for a particular service.

One method of achieving this would be to encrypt the data using a key that is available only to registered terminals. However, this may require the transmission of decryption information to each registered mobile terminal individually, which may be uneconomical and reduce the efficiency gains associated with broadcasting.

Furthermore, a mechanism for associating a registration, sale or subscription made over the telephone network with content transmitted over the digital broadcast network is required. In addition, where content is made available on payment of a fee, it is necessary for information relating to the service (such as pricing information) to be synchronized with information used to process purchases made via a telephone network.

SUMMARY OF THE INVENTION

According to one embodiment, a receiving device is configured for receiving data from a broadcast network that includes a receiving means for receiving data from the broadcast network as well as a communication means configured for sending and receiving data over a second network different from the broadcast network. A request generation means is configured to generate a request for access to data, and a decryption means is configured to decode data received from the broadcast network using a decryption key received from the broadcast network in conjunction with a rights object received from the second network.

The request generation means is configured to generate a request for transmission via the second network that, when received at its destination, includes authentication information relating to the receiving device. The authentication information may be provided automatically. A user of the receiving device may therefore request a service from the broadcast network without manually entering the authentication information. This minimizes inconvenience to the user and prevents the accuracy of the authentication information being degraded through user error.

The receiving device may be configured to generate a request in which authentication information is extracted from a component, such as a smart card, within the receiving device. Alternatively, the authentication information extracted from a network component of the second network and incorporated in the request message may include, for example, an IMEI or MSISDN number. The receiving device may also be configured to receive a media guide that includes a description of services available to the receiving device via the broadcast network.

Data relating to an available service may then be extracted from the media guide and some or all of the extracted data included in the request. The media guide may include information relating to a communication channel for a particular service, in which case the request is sent via the communication channel, or optionally using a delivery mechanism specified in the media guide.

This embodiment further provides a communication system that includes a broadcast network; a second network; an apparatus configured to transmit data over the broadcast network and second network; and one or more of the receiving devices. The second network may include a network component for handling the request message, wherein the network component is configured to extract the authentication information and add the authentication information to the request message. The network component may be, for example, a message gateway or a router.

According to another embodiment, a method of receiving data from a broadcast network includes generating, at a terminal, a request for access to the data, and retrieving authentication information relating to the terminal from a source other than manual input. The authentication information is then incorporated in the request and sent to a request handler via a second network, different from the broadcast network. The method also includes receiving one or more decryption keys from the broadcast network, and receiving at the terminal one or more rights objects from the second network. The terminal receives the data associated with the request from the broadcast network and decrypts the received data using one or more of the decryption keys in combination with the one or more rights objects. This embodiment further provides a request message incorporating authentication information relating to a terminal.

According to another embodiment, an apparatus for transmitting data to one or more selected terminals via a broadcast network that includes a generating means. The generating means generates a media guide that includes a description of services available over the broadcast network, and forwards data included in the media guide to the request handling means. A receiving means is configured for receiving a request for access to data from a terminal via a second network that is different from the broadcast network. The request handling means includes an extracting means for extracting authentication information relating to the terminal and service data corresponding to information in the media guide from the request. The request handling means includes an encryption means for at least partially encrypting the data using one or more encryption keys so that the data can only be decrypted by the terminal using one or more corresponding decryption keys in combination with one or more rights objects. At least one of the decryption keys is available to the terminal. The request handling means also includes a means for sending the one or more rights objects via the second network to the one terminal and broadcasting means configured to broadcast the media guide and the encrypted data over the broadcast network.

The apparatus of this embodiment permits synchronization of information at the terminal and broadcast network. Therefore, it can be ensured that information used to register a terminal for a service, to receive data or set up a subscription, is current. For example, the end date of a subscription period or the pricing information for a service may change on a daily basis. In order to achieve this, corresponding information may be extracted from the request and media guide and compared. Alternatively, or additionally, a notification message may be sent to the terminal to alert a user of the terminal to a discrepancy between current service information and extracted service data. The alert message may request confirmation as to whether the media guide information takes precedence over the extracted service data, which reflects service information stored at the terminal.

At least one of the decryption keys may be made available to the terminal by being broadcast over the broadcast network. The apparatus may further include means for generating at least one of the one or more rights objects. The generating means may be configured to generate a media guide that includes information identifying communication channels within the second network for use in requesting the services. This information may include a delivery mechanism used in the communication channel.

According to another embodiment, a method of providing data to one or more selected terminals via a broadcast network includes generating a media guide including descriptions of services available over the broadcast network, and broadcasting the media guide over the broadcast network. A request is then received for access to data from a terminal via a second network that is different from the broadcast network. Data is extracted from the request that corresponds to information provided in the media guide and compared with the media guide information in order to detect discrepancies therebetween.

The data is also encrypted at least partially using one or more encryption keys so that the data can only be decrypted by the terminal using one or more corresponding decryption keys in combination with one or more rights objects. It is contemplated that one or more decryption keys are available to the terminal. This method also includes sending one or more rights objects via the second network to the one terminal and broadcasting the encrypted data over the broadcast network.

The method may further include generating an updated media guide and broadcasting the updated media guide. In this case, the media guide may be updated as needed, or at regular intervals. When the updated media guide is broadcast, information from the updated media guide may also be forwarded to the request handling means.

According to another embodiment, an apparatus for transmitting data to one or more selected terminals via a broadcast network includes generating means for generating a media guide that includes a description of services available over the broadcast network. The generating means also includes an indication of one or more communication channels to be used for requesting access to data from the services, together with metadata describing the communication channels. The apparatus includes a receiving means for receiving a request for access to data from a terminal via one of the communication channels on a second network that is different from the broadcast network. An encryption means is provided for encrypting at least partially the data using one or more encryption keys so that the data can only be decrypted by the one terminal using one or more corresponding decryption keys in combination with one or more rights objects. At least one of the decryption keys is available to the terminal. This apparatus also includes a means for sending the one or more rights objects via the second network to the one terminal and broadcasting means configured to broadcast the media guide and the encrypted data over the broadcast network.

The inclusion of metadata in the media guide permits a number of communication channels to be associated with a service. This can be used to provide a selection of delivery mechanisms through which a terminal may send a request for a service and/or allocation of communication channels according to, for example, tariffs, network operators, billing arrangements, etc. The metadata may specify a delivery mechanism to be used for requests made through that channel. The media guide may be generated in the form of an XML file.

According to another embodiment, a receiving device for receiving data transmitted over a broadcast network includes a receiving means for receiving data from the broadcast network, and a communication means for sending and receiving data over a second network different from the broadcast network. The receiving means includes a request generation means configured to generate a request for access to data and decryption means configured to decode data received from the broadcast network using a decryption key received from the broadcast network in conjunction with a rights object received from the second network. The request generation means is configured to extract information from a media guide transmitted over the broadcast network, generate the request and transmit the request via a communication channel, wherein the communication channel is specified by the extracted information. Additionally, the receiving device may be configured to forward the request using a delivery mechanism specified by the extracted information.

In the event that the extracted information specifies more than one communication channel, one of the communication channels may be selected by the receiving device according to one or more predetermined criteria such as, for example, a preferred delivery mechanism or a lower cost. Alternatively, a selection may be made on the basis of a preference indicated by a user of the receiving device.

According to another embodiment, a media guide for transmission over a broadcast network includes a description of one or more services available over the broadcast network and a description of at least one communication channel through which a terminal may send a request for an available service. The communication channels are provided in a second network that is different from the first network.

According to another embodiment, a method of transmitting data to one or more selected terminals via a broadcast network includes generating a media guide. The media guide includes a description of services available over the broadcast network, and indication of one or more communication channels to be used for requesting access to data from the services together with metadata describing the communication channels. The media guide is transmitted to the terminals over the broadcast network, and a request for access is received from a terminal using one of the communication channels on a second network that is different from the broadcast network. One or more rights objects associated with the requested data is sent via the second network to the one terminal. The data can only be accessed by the one terminal using a decryption key that is available to the one terminal in combination with one or more of the rights objects. The encrypted data is broadcast over the broadcast network.

The invention further provides a communication system including a broadcast network, a second network different from the broadcast network, and one or more terminals as previously described. Additionally, the one or more of the terminals may be a receiving device as previously described.

BRIEF DESCRIPTION OF THE DRAWINGS

In order that the invention may be more fully understood, exemplary embodiments will now be described by way of example with reference to the accompanying drawings wherein:

FIG. 8 is an example of an electronic service guide relating to services broadcast over the broadcast network of FIG. 4 according to one embodiment of the invention;

FIG. 9 depicts an exemplary table of pricing information included in the electronic service guide of FIG. 8;

DETAILED DESCRIPTION OF THE DRAWINGS

Figure 1:
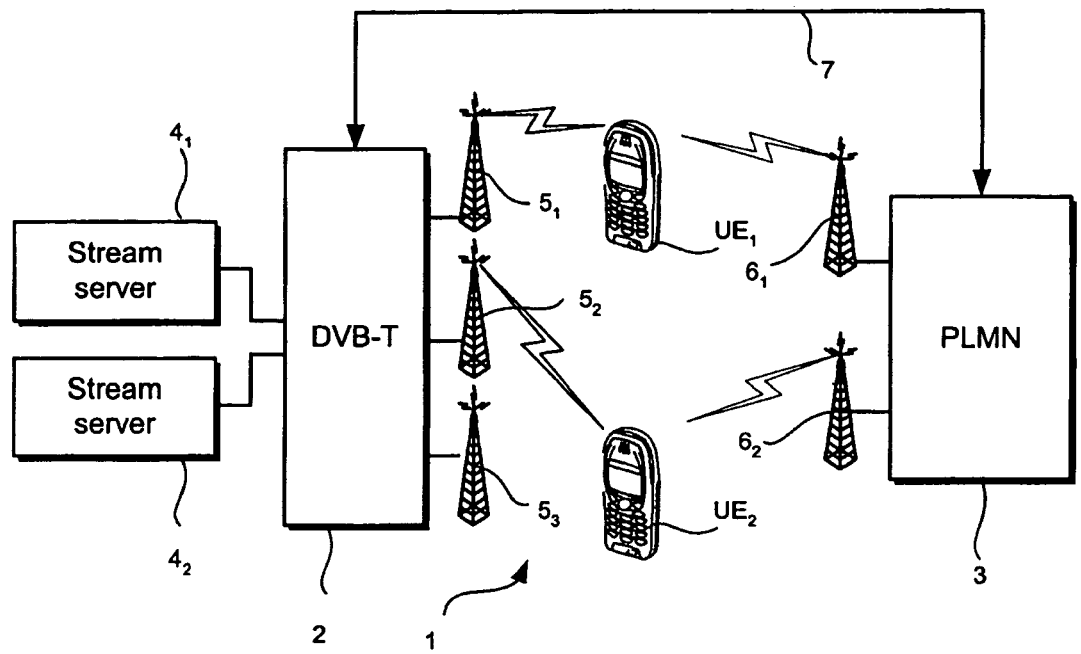
FIG. 1 is a schematic block diagram of an exemplary mobile communications system including a broadcast network and a public mobile land telecommunications network (PLMN) according to one embodiment.

FIG. 1 illustrates schematically a communication system 1 in which mobile user equipment in the form of mobile telephone handsets UE1, UE2 are configured to receive transmissions from a broadcast network, such as DVB-T type network 2 or an enhancement of that type of network, and also to communicate through a public land mobile network (PLMN) 3.

The DVB-T type network 2 transmits content such as audiovisual content, data files or images to the handsets UE1, UE2. The content is obtained from data stream servers 41, 42 in Internet protocol (IP) so that the network can provide an IP data casting (IPDC) service using the DVB-T type network 2. Two such servers 41, 42 are shown by way of example although in practice there may be many more.

The DVB-T type network 2 is cellular and antennas 51, 52 and 53 serve individual cells of the network at geographically spaced sites. The PLMN 3 may include any suitable mobile telephone network, such as 2G, 2.5G or 3G network, with antennas 61 and 62 that serve individual cells of the PLMN. A communication channel 7 may be provided between the DVB-T type network 2 and the PLMN 3 to allow bi-directional communication between the networks 2, 3, e.g,. for the interchange of service information.

Figure 2:
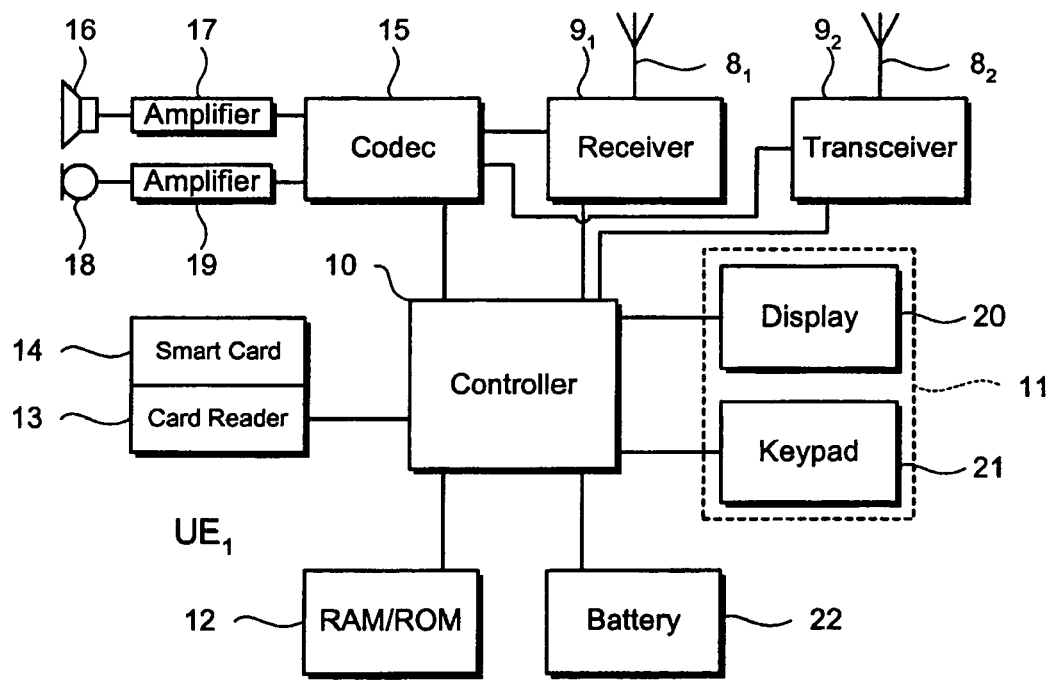
FIG. 2 is a schematic block diagram of exemplary circuits for a mobile telephone handset configured to receive broadcast transmissions according to one embodiment.

FIG. 2 illustrates the circuits of the mobile handset UE1 by way of a simplified example. Handset UE2 is of a substantially similar configuration. The handset includes first and second antennas 81, 82, a receiver 91 and a transceiver 92. The first antenna 81 and receiver 91 are configured to receive signals from the DVB-T type network 2. The second antenna 82 and transceiver 92 are used to transmit and receive signals to and from the PLMN 3. The receiver and transceiver 91, 92 each include respective RF signal processing circuits, not shown, for amplifying and demodulating received signals and respective processors, not shown, for channel de-coding and de-multiplexing.

The handset UE1 also includes a controller 10, a user interface 11, memory 12, a smart card reader 13, smart card 14 received in the smart card reader 13, a coderdecoder (codec) 15, a speaker 16 with corresponding amplifier 17 and microphone 18 with corresponding preamplifier 19. The user interface 11 includes a display 20 and keypad 21. The display 20 is configured to display images and video by, for example, being larger and/or having greater resolution than the display of many conventional mobile telephone handsets and being capable of displaying color images. The device also includes a rechargeable battery 22. The controller 10 manages operation of the handset under the direction of computer software stored in memory 12. For example, the controller 10 provides an output for the display 20 and receives inputs from the keypad 21.

Figure 3:
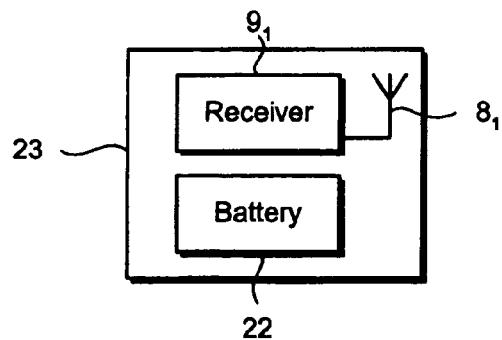
FIG. 3 is a schematic block diagram that illustrates an exemplary battery pack for the handset of FIG. 2.

Referring to FIG. 3, the battery 22, the first antenna 81 and the receiver 91 may be incorporated into a battery pack 23. A conventional mobile telephone handset may be configured to receive data via the DVB-T type network 2 by replacing a conventional battery pack (not shown) with battery pack 23, which includes the receiver 91 and providing software for enabling communication between interfaces in the battery pack 23 and handset. Alternatively, the first antenna 81 and the receiver 91 may be incorporated into a cover (not shown) for a conventional mobile telephone handset so that by replacing the cover and necessary software for the handset, the conventional handset can be upgraded to receive transmissions from the DVB-T type network 2.

The handset UE1 can receive DVB-T type transmissions through receiver 91 from the DVB-T type network 2. The received signal is amplified, demodulated, channel de-coded and demultiplexed. The resulting demultiplexed signal (not shown) is filtered so as to extract bursts of datagrams. Datagram bursts are fed into a time-slice buffer that is provided by the controller 10 and memory 12 so as to produce a stream of datagrams, which are not time-sliced. In one embodiment of invention, the datagram stream is substantially continuous and/or transmitted at a substantially constant rate. The resulting data stream is then displayed on display 20 with respect to video and other visually displayable signals and the audio signals are passed through codec 15 and amplifier 17 to speaker 16.

The transceiver 92 is for use with PLMN 3 and uses a conventional mobile telecommunications protocol to achieve bi-directional voice and data communication under the control of controller 10, with displays being provided on display 20 and audio being handled by means of speaker 16 and microphone 18. While the device UE1 has been described in terms of a mobile telephone handset, it may also include a personal digital assistant PDA or other mobile terminal capable of at least receiving signals from the DVB-T type network 2. The device UE1 may also be semi-fixed or semi-portable such as terminal in a vehicle.

Figure 4:
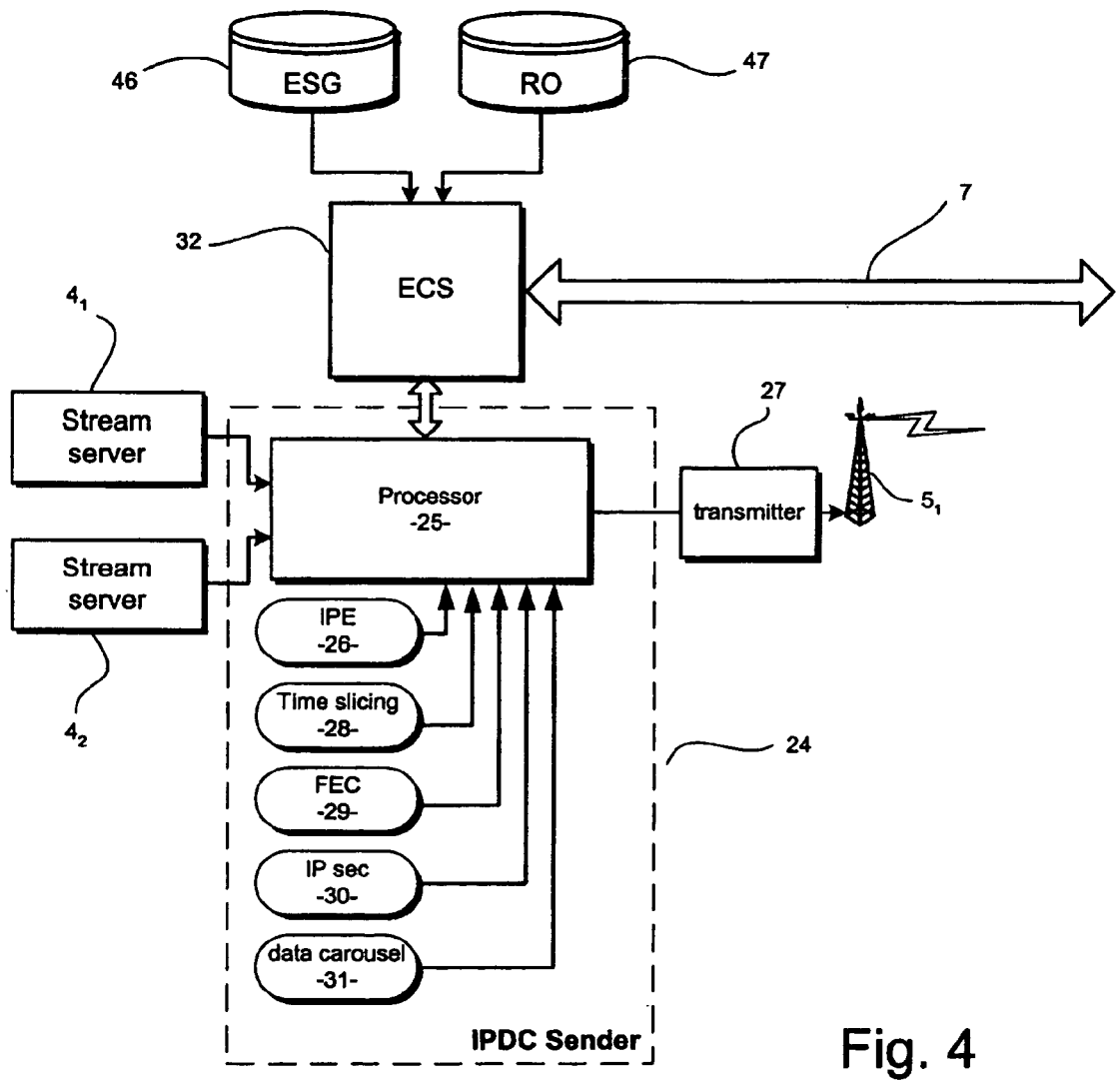
FIG. 4 is a schematic block diagram that illustrates in more detail an exemplary broadcast network including an e-commerce system according to one embodiment.

FIG. 4 illustrates an exemplary DVB-T type network 2. The stream servers 41, 42 supply content in the form of IP datagrams to an Internet Protocol Datacast (IPDC) sender 24. The IPDC sender 24 includes a main processor 25, which receives IP datagrams from the data stream content servers 41, 42. The main processor 25 runs a number of processes associated with multi-protocol encapsulation of the IP data. IP encapsulation process 26 run by the processor 25 embeds the IP packets into multi-protocol encapsulation (MPE) sections that are incorporated into MPEG-2 transport stream (TS) packets. For further details reference is directed to ETSI EN 301 192 V1.3.1 (2003-01) "Digital Video Broadcasting (DVB) DVB specification for data broadcasting" Section 7. Briefly, the IP packets belonging to the same stream, possibly from several IP sessions, are configured for inclusion in the TS stream as an elementary stream (ES). This is achieved by placing the IP datagrams in MPE sections and placing the sections into packets of the TS for broadcast by transmitter 27, through antenna 51.

The main processor 25 also performs time-slicing, which is used to reduce the time that the receiver 91 needs to be switched on to receive data thereby saving its battery power. The main processor 25 carries out a time-slicing process 28 in which the MPE sections are configured in time spaced bursts in the TS together with time-slicing information that indicates when the receiver should be switched off and when to turn it on again, in order to receive the service while minimizing power consumption in the receiver circuitry.

Also, a forward error correction (FEC) process 29 may be carried out in order to create packets of data containing forward error correction codes (FECs) to be incorporated into the TS. The advantage of implementing FEC in the IPDC transmissions from IPDC sender 24 lies in the fact that the transmission over the air is particularly error-prone, when compared to transmission in wired networks. There are two main reasons for this. Firstly, signal-to-noise ratios in radio transmission are not as good as in wire-based transmission media and can have considerable fluctuations. Furthermore, due to the unidirectional nature of the DVB-T type network 2, it is not possible to use protocols, such as the Transmission Control Protocol (TCP), that request re-transmission of lost packets.

The main processor 25 also performs security function processes 30 to allow IP encryption and authentication codes to be processed, such as IPSec according to Internet Engineering Task Force (IETF) RFC 2401. Such codes can be used to check the integrity of IP datagrams received from the stream servers 41, 42, and are included in the encapsulated data in the TS. The codes are included as part of a security key scheme that enables only authorized UEs to receive the broadcast data successfully. The main processor 25 also controls a data carousel 31, which controls transmission of rights objects to UEs, as will be described later.

Figure 5:
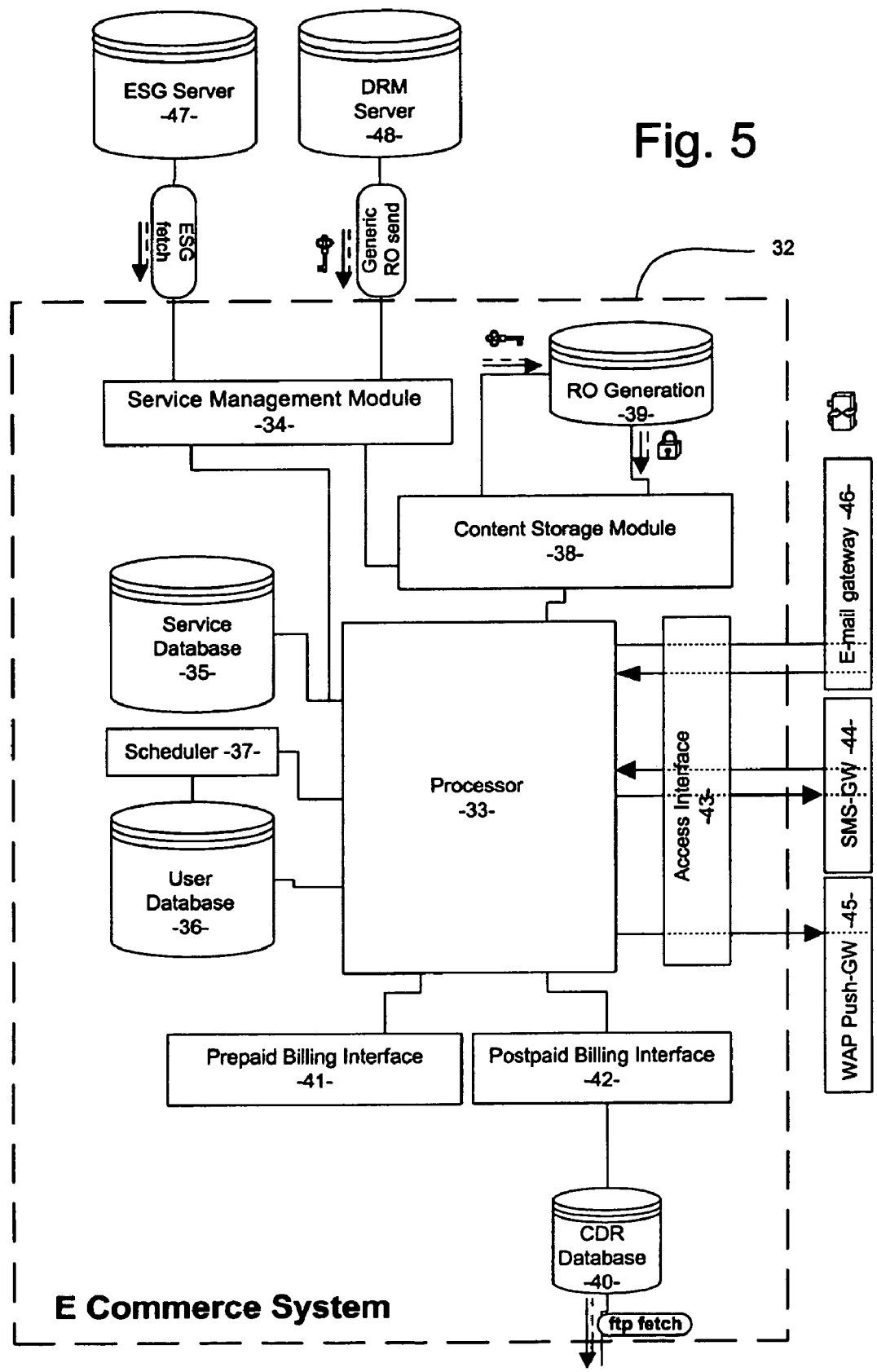
FIG. 5 is a schematic block diagram that illustrates an exemplary e-commerce system of FIG. 4 in more detail.

An e-commerce system 32, hereafter referred to as an ECS, is provided for handling registrations and subscriptions to a service associated with the content. The ECS 32, one embodiment of which is shown in more detail in FIG. 5, includes a processor 33, a service management module 34, a service database 35, a user database 36, a scheduler 37, a content storage module 38, a rights object (RO) generation module 39, a Charging Detail Record (CDR) database 40, together with billing interfaces 41, 42 and an access interface 43.

The ECS 32 is configured to communicate via the PLMN 3, for example, in order to receive subscription or registration requests from the UEs via an interaction channel, or to forward billing and/or payment information to an operator of the PLMN 3. In one embodiment, the ECS 32 can receive requests for content and send response messages through the PLMN 3 via a Short Message Service (SMS) gateway 44. A Wireless Application Protocol (WAP) Gateway 45 is also provided in one embodiment of the invention to allow data to be sent from the ECS 32 to a UE, via the PLMN 3. A gateway 46 for handling e-mail communications may be provided. The processor 33 may, in one embodiment, be configured to send and receive HyperText Transfer Protocol (HTTP) data, in which case the access interface 43 converts incoming data into HTTP and outgoing data into a suitable format for transmission as an e-mail, a SMS message and/or using WAP or another wireless protocol.

In one embodiment, the ECS 32 is configured to receive electronic service guide (ESG) data from an external ESG server 47. The ECS 32 may receive ESG data from one or more network operators or service providers, wherein the respective sources of the different ESGs can be identified.

The ESG may include a list of available services, identifiers used for denoting the services, pricing information and a transmission schedule relating to those services, as well as information identifying the channel on which the services are to be provided. In one embodiment, part or all of the ESG, or media guide, are sent at predefined intervals. The ESG is generated and updated periodically and may include information on the last update, modification datetime and/or information on its validity period, such as an indication of when the ESG is due to be updated. When an ESG is generated or updated, it is broadcast over the DVB-T type network 2 and also sent to the ECS 32. The service management module 34 then extracts information relating to the services, such as the service identifier and pricing information, and stores these in a service database 35.

The user database 36 stores information relating to subscriptions to services sent from the handsets UE1, UE2. Typically, the information will include a UE identifier for uniquely identifying a handset UE1, UE2, such as an International Mobile Equipment Identity (IMEI) or Mobile Subscriber Integrated Services Digital Network (MSISDN) number, together with the service identifier, information relating to the price paid by a user of the handset UE1, UE2 for that service and the time and date at which the subscription is to start and end. The user database 36 may include also other type information, such as fingerprints, other biometric identification and/or user images for identifying the user in addition to, or instead of, the UE identifier.

In one embodiment, the ECS 32 may also receive data from an external Digital Rights Management (DRM) server 48. The DRM server 48 is configured to generate rights objects (ROs) for use in encrypting the content and/or restricting the use of that content when received at a handset UE1, UE2. For example, a RO associated with particular content may be defined so that a user of the handset UE1 can view the content a limited number of times or during a limited period. A RO may also prevent forwarding of the received content to another handset UE2.

The processor 33 generates billing information in the form of a CDR. Where a handset UE1, UE2 is operated under a postpaid subscription agreement, the CDR is sent via interface 42 for storage in the CDR database 40. The CDRs saved in the CDR database 40 can then be forwarded to a Home Location Register (HLR) of the PLMN 3. Where a handset UE1, UE2 is operated under a prepaid billing arrangement, the billing information is dealt with using a different mechanism. In this case, the processor 33 may send CDRs via interface 41 for storage in a separate database, not shown, where the data is compared against credit units available in that account.

Figure 6:
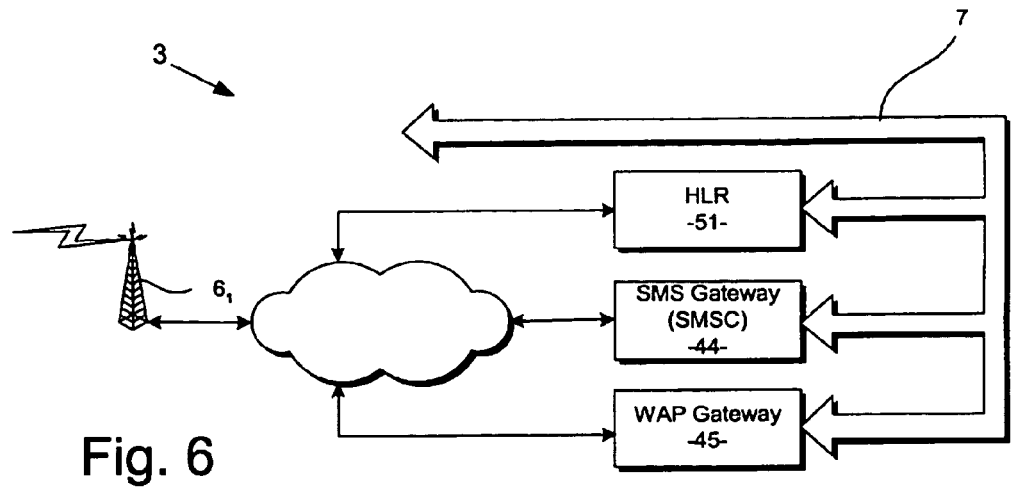
FIG. 6 is a schematic block diagram that illustrates in more detail an exemplary PLMN.

An example PLMN 3 is depicted in FIG. 6 and includes a Short Message Service Centre (SMSC) 44 for handling SMS messages sent by, or directed to, the handsets UE1, UE2, along with a Wireless Application Protocol (WAP) gateway 45. HLR 51 administrates and manages a database of information relating to the PLMN 3, subscribers and devices UE1, UE2 connected to the PLMN 3 and subscribers to the PLMN 3. The SMSC 44, WAP gateway 45 and HLR 51 can communicate with the ECS 32 through the communication link 7. A procedure for registering a handset UE1, UE2 to receive a service will now be described, with reference to FIGS. 7 to 12.

Figure 7:
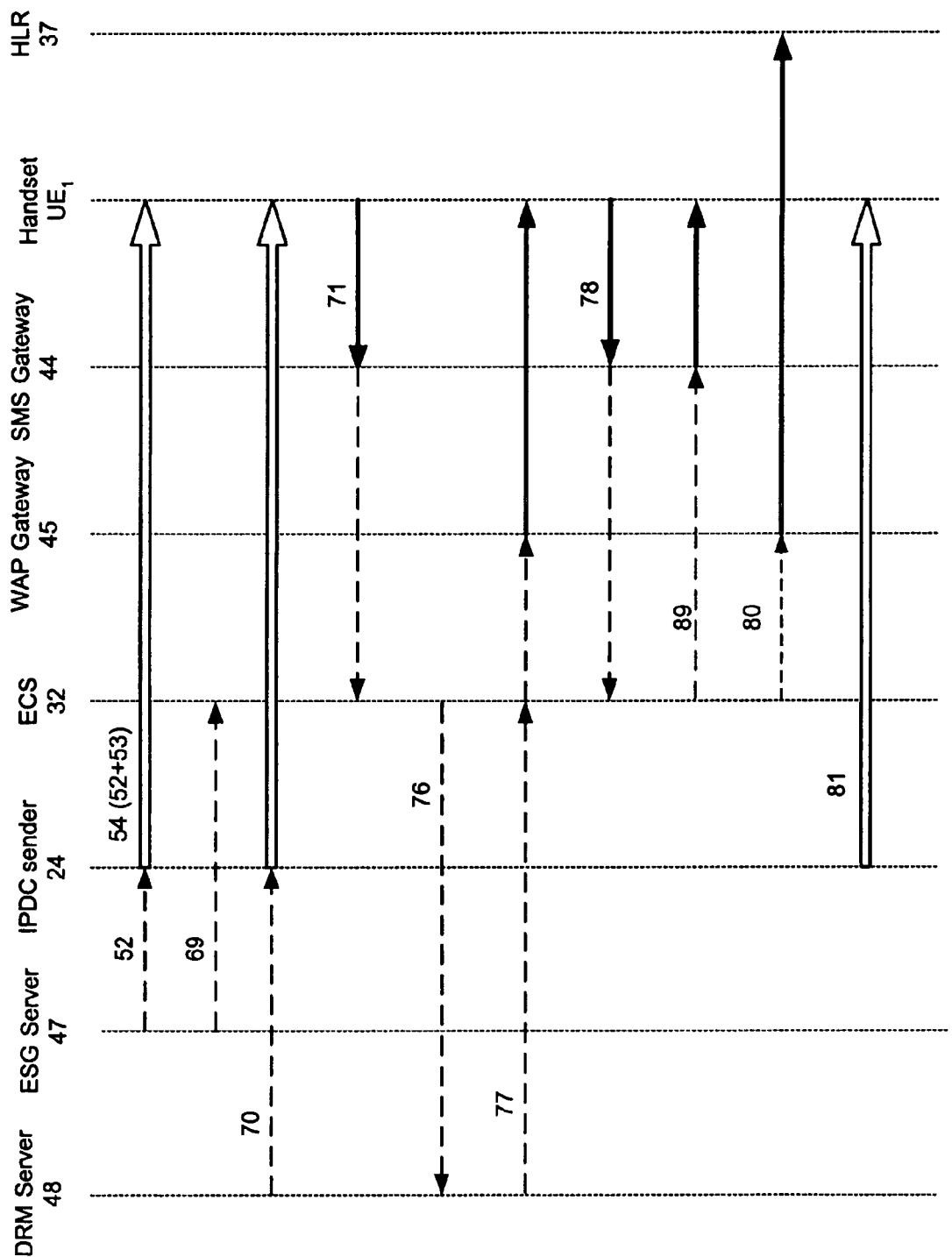
FIG. 7 is a flow diagram showing the signals transmitted between components of the communications system of FIG. 1 according to one embodiment.
Figure 10:
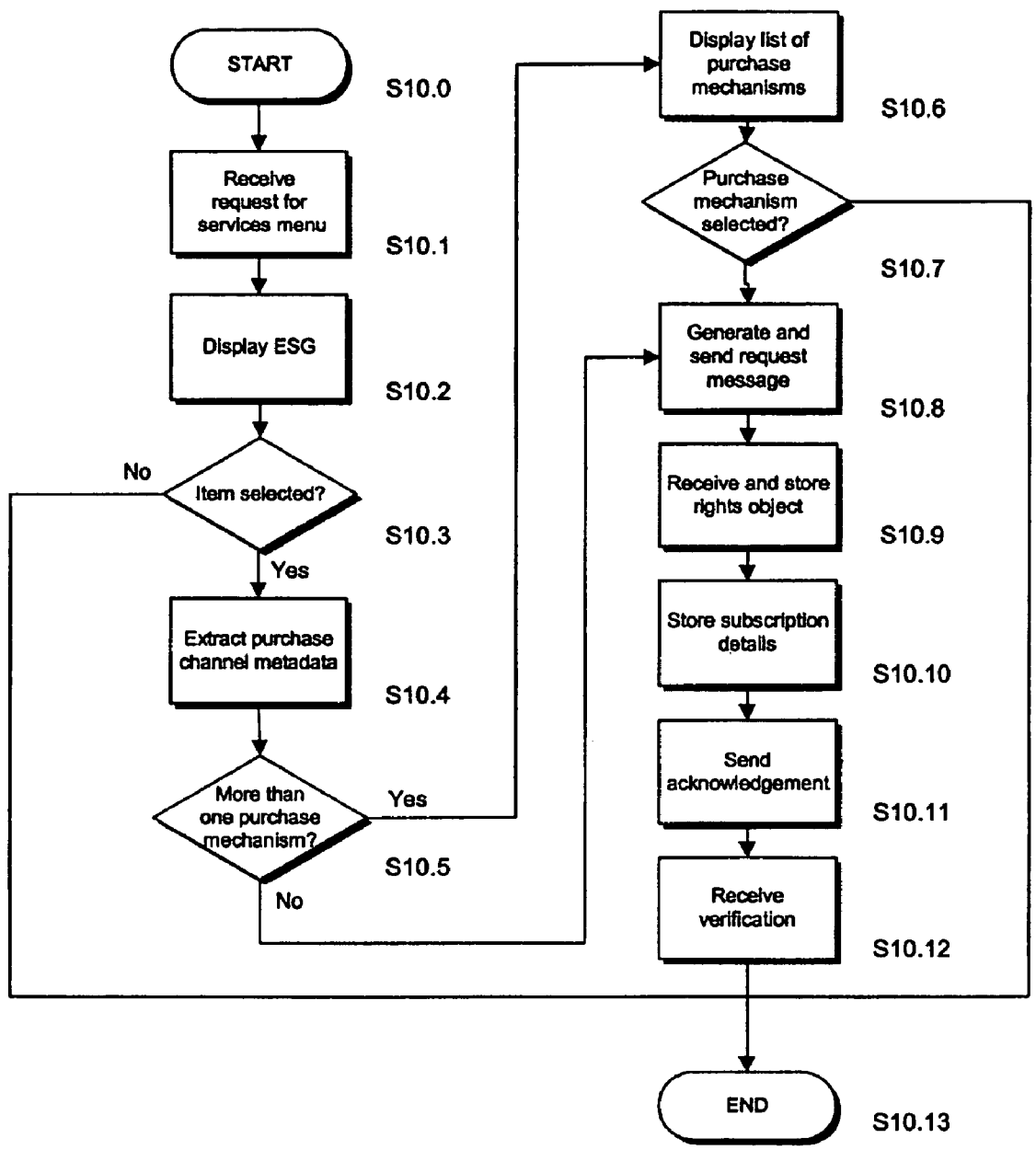
FIG. 10 is a flowchart of exemplary steps in a registration and subscription procedure performed by a user terminal, according to one embodiment.

FIG. 7 shows in an exemplary way the transmission of signals between user equipment, for example, handsets UE1, ECS 32 and other parts of the communication system. Signals transmitted over the DVB-T type network 2 are shown using white arrows. Signals transmitted over the PLMN 3 are indicated using solid arrows. Signals sent between the ECS 32, IPDC sender 24 and ESG and DRM servers 47, 48 are shown using dashed lines.

With reference to FIG. 7, an ESG 52, which describes the available services, is generated by the ESG server 47 and sent to the IPDC sender 24. In this example, the ESG 52 is an XML file. The IPDC sender 24 modifies the ESG 52, incorporating metadata 53, which provides details of purchase channels for use in subscribing or purchasing the available services. The modified ESG 54 is then broadcast to handsets UE1, UE2 over the DVB-T type network 2 by the IPDC sender 24. When a modified ESG 54 is received by a handset UE1, UE2, it is stored in its memory 12. An example of a modified ESG 54 including the original ESG 52 and metadata 53 is shown in FIG. 8.

In this particular example, the ESG 54 is also an XML file. The purchase channels are defined using a channel identifier 55, an indicator 56 denoting the type of delivery mechanism used in that channel and an address 57. A prefix 58 may be specified for use in the request message. For example, in FIG. 8, a first purchase channel, identified as C01, is defined, through which requests are made in the form of SMS messages containing the text "purchase request" sent to the ECS 32 via a telephone number 176001. A second purchase channel C02 is also configured to convey SMS message requests to the ECS 32, where the message is identified as a request due to the inclusion of text "##pr#". Requests made through the second purchase channel are sent to the ECS 32 via telephone number 80808. In order to submit a request through a third purchase channel C03, an e-mail with a subject "subscribe" is sent to an address adm@operator.com.

Optionally, the ESG 52 and modified ESG 54 may also include a base price 59 associated with use of the purchase channel and, if required, a note 60 of the currency used. For example, the provision of multiple purchase channels C01, C02, C03 may be advantageous where more than one mechanism can be used to request services or content from the ECS 32, such as SMS, e-mail, etc. Moreover, a service or content may be available to users subscribing to different mobile networks, which may charge different rates, or having different types of contracts with their mobile network operator, such as pre-paid and post-paid agreements. In this situation, the provision of different purchase channels C01, C02 using the same request mechanism may be provided to facilitate billing of customers with different billing arrangements.

The description of a service includes a service identifier 61, used to identify that particular service S01 (service identifier 61a), a component of a service S02 (service identifier 61b) or a bundle of services B01 (service identifier 61c). For example, according to the ESG 52 and modified ESG 54 of FIG. 8, a "Team News" service S01 may be available, providing news, latest scores and/or multimedia clips of a particular football team. It may be possible for a user of a handset UE1 to subscribe to only the "Latest Scores" component S02 of service S01. In addition, the service S01, including component S02 may be included in a "bundle" of services B01 where a user can receive a number of services through a single subscription. In this example, the "Football News" bundle includes "Team News" and, therefore, "Latest Scores" together with other services providing national and international football news.

The ESG 52 and modified ESG 54 further include price information 62 for each item, such as available services S01, components S02 and bundles B01. In this embodiment, the price information 62 is provided in the form of an XML table. An example table showing the price information given in ESG 52, 54 is depicted in FIG. 9. The rows of the table 62 relate to service S01, component S02 and the bundle of services B01 broadcast over the DVB-T type network 2, indicated by the relevant service identifiers 61a, 61b, 61c. In this example, the price of service S01 is given in terms of the days 63a to 63f remaining on a 31-day subscription period, where the price for accessing the service until the expiry of that subscription period is reduced accordingly. A similar pricing structure is used for component S02, where the subscription period is 7 days, and bundle B01. In addition, prices for reduced-cost packages are given, for example, where a subscription is to include a subsequent subscription period 63g or the next two subscription periods 63h. The table 62 also includes an indication of the currency used when quoting the prices.

The ESG 52, 54 also includes an indication 64 of one or more purchase channels C01, C02, C03 that can be used for requesting a service S01, component S02 or bundle B01. In the example of FIG. 8, service S01 and bundle B01 can be requested using either of the SMS purchase channels C01, C02. Service component S02 can be requested using either of the SMS purchase channels C01, C02 or the e-mail purchase channel C03. If required, the ESG 52, 54 may also include data 65 providing a description of the service to a user of the handset UE1, an indication 66 of the broadcast channel over which the service will be transmitted and validity start and end dates 67, 68. Where the service consists of a single data delivery session, for example, one-off delivery of a file or pay-per-view content, these dates may correspond to the start and end times of a transmission broadcasting the relevant content. For a continuous service, such as a sports news service, the dates may relate to the beginning and end of a subscription period.

The IPDC sender 24 also sends ESG data 69 to the ECS 32, in the form of an XML table of price information 62, as depicted in FIG. 9 and described above, together with the date on which the ESG data 69 was generated and an identification of the IPDC sender 24. The table shown in FIG. 9 includes an indication of the currency used when quoting the prices. However, such an indication is not required where a default currency is used. For example, the prices for service S01 are given in US dollars, while prices for service component S02 and bundle B01 are in Euros. If the ECS 32 is configured to use Euros as a default currency, it is not necessary to include an indication in the ESG data 67 that the prices for service component S02 and bundle B01 are quoted in Euros. The ESG data 69 is received by the service management module 34 and stored in the service database 35.

The ESG 52 and modified ESG 54 may be updated as required, for instance, as new services become available or as the prices of one or more of the services change. For example, a provider of service S01 may have a promotion, in which the price for accessing the service S01 is reduced for a limited period. In this case, the ESG 52 would be updated to reflect the change in price by the ESG server 47 and sent to the IPDC sender 24. A modified ESG 54 would be generated by combining the updated ESG 52 with metadata 53 and broadcast to the handsets UE1, UE2. In addition, corresponding ESG data 69 is sent to the ECS 32. If required, the ESG 52, 54 and ESG data 69 may be updated on a daily basis.

The data carousel 31 within IPDC sender 24 periodically transmits a digital rights management (DRM) message 70 to the handsets UE1, UE2, via the DVB-T type network 2. When received, the DRM message 70 is stored in the memory 12 of the handset UE1, UE2. The DRM message 70 includes decryption keys, extracted from the DRM server 48, that can be used to decode content from the services broadcast over the DVB-T type network 2. However, the decryption keys cannot be used without an unlocking key, or rights object (RO). Therefore a handset UE1 that has received the DRM message 70 can receive content from the services broadcast over the DVB-T type network 2, but cannot decrypt it unless an associated RO has been stored in its memory 12.

The user may then select a service S02 or content from the list, for example, using keypad 21. When a selection has been made (step s10.3), the metadata describing the designated purchase channel C01, C02, C03 for the chosen service S02 is extracted from the stored ESG 52 (step s10.4). Where a choice of purchase channels is available, using more than one delivery mechanism (step s10.5), a list of the delivery mechanisms will be displayed to the user (step s10.6). For example, in this particular case, service component S02 can be requested using an SMS message, through purchase channels C01 and C02, or by e-mail through purchase channel C03. The user may then specify whether the request for service component S02 is to be made using an SMS message or by e-mail (step s10.7).

Where the user selects a delivery mechanism used by more than one designated purchase channel C01, C02, the handset UE1 will choose the appropriate purchase channel C01, C02 for that mechanism (not shown). This decision may be based on information stored in its memory 12 regarding, for example, the mobile network operator or agreement under which it accesses the PLMN 3. Alternatively, if both purchase channels C01, C02 are suitable for requests from handset UE1, the decision may be based on the base unit 59 indicated in the stored ESG 54.

In this example, more than one delivery mechanism is available to handset UE1 for communication with the ECS 32. However, if only one delivery mechanism is available, steps s10.6, s10.7 are omitted. The handset UE1 generates a request message 71 and sends it to the ECS 32 using the address 57 indicated in the metadata 53 of the stored ESG 54 (step s10.8). The request is sent via the PLMN 3 using the selected purchase channel.

Figure 11:
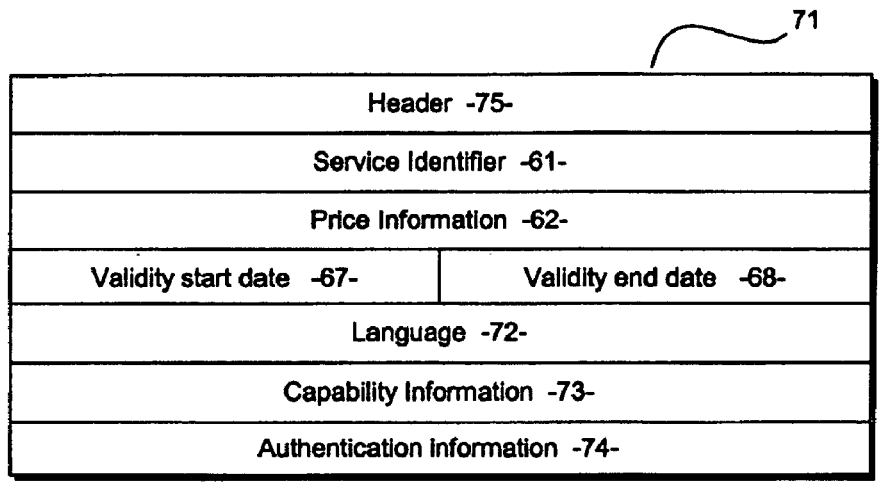
FIG. 11 depicts an exemplary format of a request message sent from a mobile telephone handset and processed by the e-commerce system of FIG. 5 according to one embodiment.

The request message 71 conforms to the format shown in FIG. 11 and includes the following information: Service Identifier 61 (This identifier 61 is specified in the stored ESG 54, which is recognized by the handset UE1, IP sender 24 and ECS 32 as uniquely indicating a particular service); Price Information 62 (This is also extracted from the stored ESG 54, and may include an indication of the currency used in the quoted price. The currency may be omitted, wherein a default currency, specified by the ECS 32 is used); Validity Start and End Dates 67, 68 (The validity start and end dates 67, 68 are extracted from the stored ESG 54, which indicate when the service will be accessible to the user); Language 72 (This is the user's preferred language for communicating with the ECS 32); Capability Information (CI) 73 (This indicates whether the UE1 can support the service with respect to the keys in the DRM message 70 and a rights object associated with the service); and Authentication Information 74 (This contains information identifying the handset UE1 or smart card 14, such as its IMEI or MSISDN number).

Instead of being entered manually by the user, the authentication information 74 may be automatically incorporated into the request message 71. The mechanism by which this information is included depends on the channel used to send the request 71. For example, if the request is sent over the PLMN 3, the authentication information may be a MSISDN number retrieved from network components, such as the SMSC 44, located along a route followed by the request message 71 between the handset UE1 and ECS 32. Alternatively, where the request message 71 is in the form of a SMS message, as in this example, the authentication information 74 may be retrieved from a header 75 of the request message 71, the smart card 14 or network components as described above.

Figure 12:
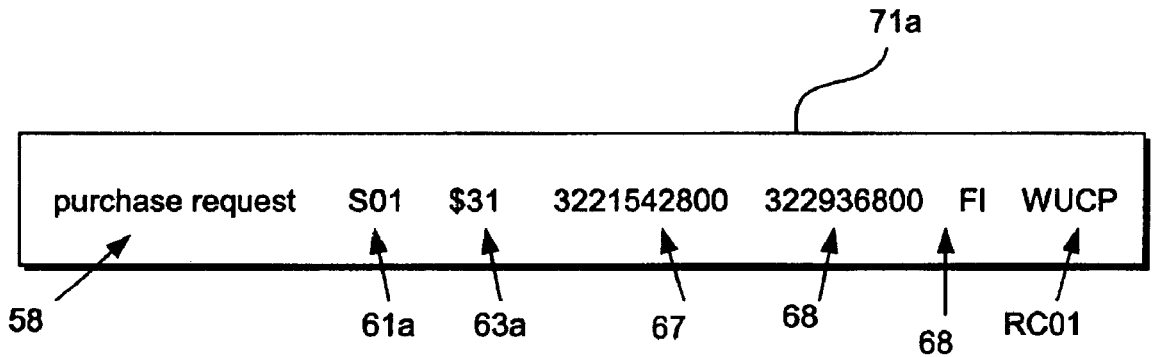
FIG. 12 depicts an example of a request message sent from a mobile telephone handset.

An example of a request message 71a is shown in FIG. 12. The request message 71a is sent via SMS. In this particular example, the request is for a one-month subscription to service S01. The request message 71a includes the prefix 58 associated with the purchase channel used, as extracted from the ESG 54. In this example, the purchase channel is C01 and the prefix 58 is "purchase request". The request further includes the relevant service identifier 61a, and the current price corresponding to the requested subscription period 63a, which is taken from the price information table 62. In this example, the current price is $31. The request message 71a also includes validity start and end dates 67, 68 that, in this example, are given according to Network Time Protocol (NTP). A language code 72 is also included, which may be taken from data in the terminal and, in this example, a response channel RC01 is also specified for use in communications between the ECS 32 and handset. In this example, the request message 71a specifies that responses are to be in Finnish and sent using a WAP Unconfirmed Push mechanism.

The request message 71, 71a may further include a keyword, not shown, specifying the type of request. For example, the request message 71a may include a command "SUBSCRIBE" in order to indicate that it requests a subscription to a service. The request message 71 is sent to SMS Center 44, using as address 57 the number "176001." The address 57 is retrieved from the ESG metadata 53. The SMSC 44 adds the subscriber's MSISDN number to the request before forwarding the requests to the ECS. Below is depicted the SMS message, which is received at the ECS.

Figure 13:
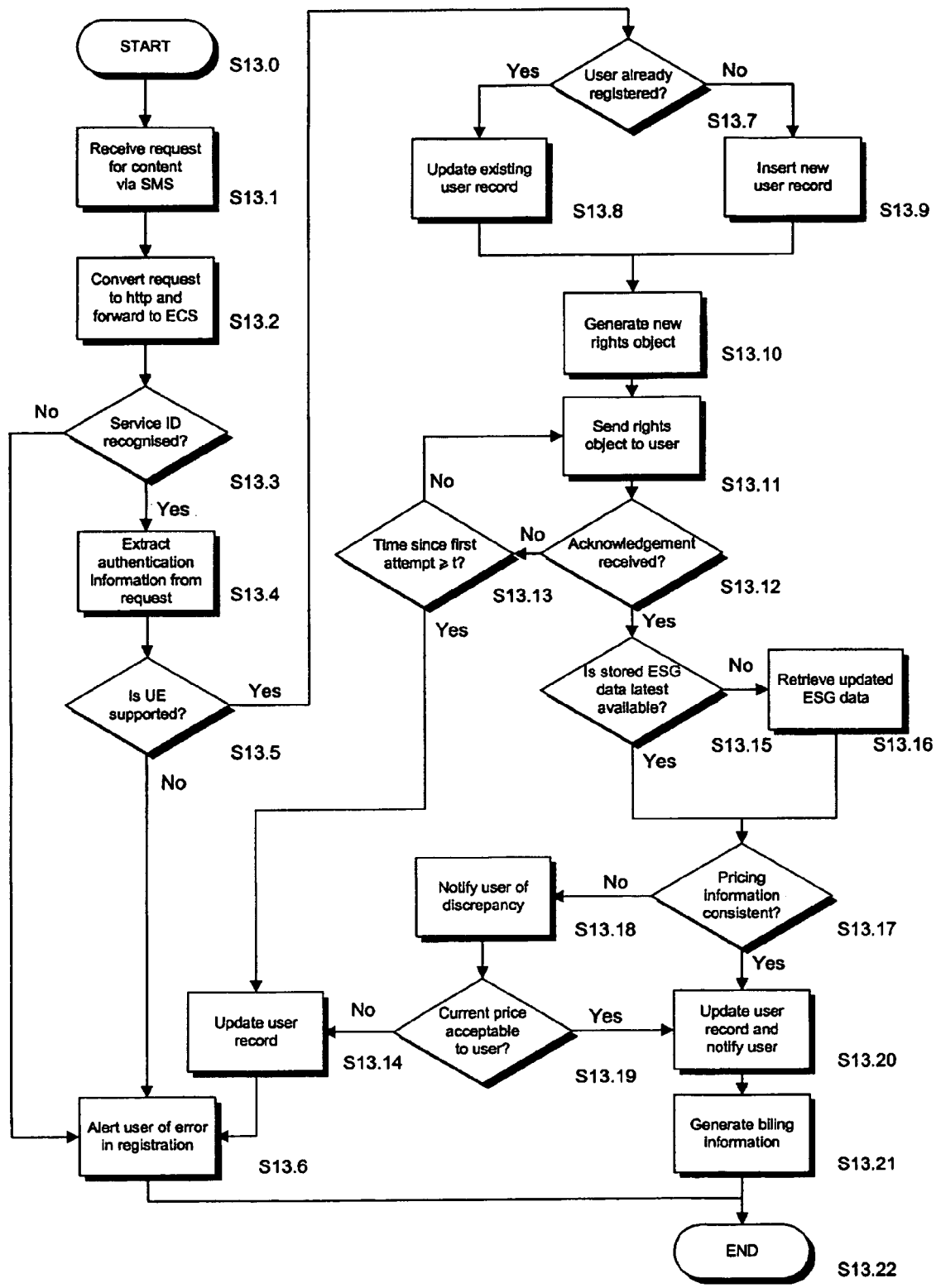
FIG. 13 is a flowchart of exemplary steps in a registration and subscription procedure performed by the broadcast network of FIG. 4, in conjunction with a mobile telephone handset performing the steps shown in FIG. 10.

The procedure followed when a request message 71 is received at the DVB-T type network 2 is shown in FIG. 13. Starting at step s13.0, a request message 71 arrives at the SMS gateway 44 (step s13.1) and is directed to the access interface 43, where it is converted into HTTP and forwarded to the ECS 32 (step s13.2). This communication may be secure, for example, using secure sockets layer, Secure HTTP (S-HTTP) or a similar protocol. Where this is the case, the access interface 43 terminates a secure sockets layer associated with the communication once the request 71 is forwarded to the ECS 32.

The ECS 32 checks whether the service identifier 61 is recognized (step s13.3), that is, whether the service identifier 61 matches any of the service identifiers associated with the available services, that have been saved in the service database 35. If so, the ECS 32 extracts the authentication information 74 (step s13.4) and determines whether the handset UE1 identified by the authentication information 74 is a device that is supported, using one or both of the capability information 73 included in the request message 71 and reference data stored in the user database 36 (step s13.5). If it is determined that the handset UE1 that has sent the request message 71 is not supported at step s13.5, or if the service identifier 61 is not recognized at step s13.3, a SMS message or similar is sent to the handset UE1 to alert the user of an error in the request message 71 (step s13.6) and the error is logged. No further action is taken.

If the handset UE1 is supported and the service identifier 61 recognized, the ECS 32 proceeds with registering the user. The ECS 32 checks whether the user database 36 already contains a user record corresponding to the authentication information 72 (step s13.7). That is, whether a UE with the same UE identifier, for example, the MSISDN number, has previously requested a service through the ECS 32. If so, a service record for the user is updated to indicate that the user has requested the service denoted by the service identifier 61 and to include further information, such as the current terminal used, the date and time that the request message 71 was received, the start and end times 67, 68 given in the request message 71, the type of service requested, e.g. whether the service is continuous or not, a current access gateway, such as SMSC 44, used by the handset UE1 etc. (step s13.8).

If there is no previous record for the user, a new user record is set up and stored in the user database 36 (step s13.9), which includes a UE identifier, the MSISDN number of the handset UE1 or its smart card 14, together with a new service record, which includes the service information described in relation to step s13.8. Therefore, the data used to register the handset UE1 to receive the service includes the user record, service user records, data identifying the handset UE1 and the price for the requested service. The required information is retrieved from the user database 36, generated by the ECS 32 and/or automatically included in, and extracted from, the request message 71. The user of handset UE1 is not required to manually enter any of the registration data.

The ECS 32 may also have access to information relating to the terms of a contract between the user of handset UE1 and a mobile network operator for use when, for example, the contract terms agreed by the mobile network operator vary from country to country. This information may also be used to facilitate billing the end-user. This information may be pre-stored in the ECS 32. If a purchase channel C01, C02 has been assigned for a given mobile network operator and/or users subscribing to a mobile network under a particular agreement, the ECS 32 may determine contract information on the basis of the purchase channel C01, C02 through which the request message 71 has been sent.

The ECS 32 sends a request 76 for the generation of a RO 77 by the RO generation module 39, based on a generic RO retrieved from the DRM server 48. The RO 77 is generated in accordance with the service identifier 61 of the requested service, validity times and dates 67, 68, authentication information 74 and an access gateway, in this example, the SMSC 44, associated with the handset UE1 (step s13.10), in order to define the rights that a user of handset UE1 has in respect of the content. For example, the RO 77 may limit the number of times a user may access the content, specify that the content is available for access for a limited time only and/or restrict the user's ability to forward or save the content. The generated RO 77 is stored in the content storage module 38 and sent to the handset UE1 over the PLMN 3 (step s13.11) using a S-Unit-Push or WAP unconfirmed push over SMS mechanism. On receipt of the RO 77, the handset UE1 saves the RO 77 in a secure section within its memory 12 for handling digital rights and ROs (step s10.9). Optionally, the handset UE1 may store a note of the details of the subscription in the secure part of its memory 12 at this stage (step s10.10). The handset UE1 then sends an acknowledgement 78 to the ECS 32, via the purchase channel C01 (step s 10.11).

The ECS 32 determines whether acknowledgement 78 has been received (step s 13.12) and, if so, determines that the RO 77 was successfully received by the handset UE1. However, if no such acknowledgement 78 is received, the SMS gateway 44 attempts to re-send the RO 77 to the handset UE1 (step s13.11). Continued attempts are made until a predefined period of time t since the first attempt to send the RO 77 has elapsed (step s13.13). If this is unsuccessful, the purchase or subscription is deemed to have failed. The user's record in the user database 36 is amended to remove any reference to the failed purchase or subscription (step s13.14) and an error message is sent to the handset UE1 (step s13.6).

On receipt of an acknowledgement 78 (step s13.12), the ECS 32 extracts the current pricing information for the user's access to the service from the service database 35. In order to do this, the ECS 32 checks whether the ESG data 69 stored in the service database 35 is the most recent available. If it is determined that the stored ESG data 69 is not up to date, for example, if it is known that the ESG 52 is updated daily and the date information in the stored ESG data 69 relates to a previous day, updated ESG data 69 is fetched from the ESG server 47, not shown (step s13.14), stored in the service database 35 and the relevant pricing information 62 extracted.

In embodiments where price information 62 is included in the request message 71, the price information 62 extracted from the ESG data 69 and the price information 62 provided in the request message 71 are compared. If the pricing information 62 from these two sources 69, 71 are inconsistent (step s13.17), a message (not shown) is generated and sent to the user to notify them of the discrepancy (step s13.18). In some embodiments, the message may request confirmation from the user as to whether the current price, as indicated by the ESG data 69, is acceptable. If the user sends such confirmation (step s13.19), the process continues using the current price as indicated by the ESG data 69. If the user indicates that the current price is unacceptable (step s13.19), the purchase or subscription process is aborted, the relevant record in the user database 36 is updated accordingly (step s13.14) and an error message, not shown, is sent to the user (step s13.6).

The user record in the user database 36 is then updated with information about the price of the user's access to the service and an SMS message 89 is sent to the handset UE1 to notify the user that they are now registered to receive the service (step s13.20). On receipt of this notification message 89 (step s10.12), the handset UE1 stores a note of the details of the subscription in the secure part of its memory 12, if such a note was not stored earlier, on receipt of the RO 77.

The ECS 32 then generates information 80 for use in billing the user (step s13.21). Where the user subscribes to a mobile network under a postpaid agreement, the billing information 80 is stored in the CDR database 40 and forwarded to the HLR 37 of the relevant mobile network, so that the user can be charged for the service through the same billing arrangement as their subscription to the mobile network. A separate mechanism is used to bill users utilizing the mobile network under a prepaid access agreement. The registration and purchase/subscription procedure is then complete (steps s10.13, s13.22). It should be noted that this procedure may be configured so that the user is required to submit only a request message 71. The authentication information 74 required to register the user at the ECS 32 is provided without any further manual intervention by the user.

The handset UE1 continues to receive the TS broadcast over the DVB-T type network 2 as before. However, as a RO 77 relating to their chosen service is now stored in the memory 12 of the handset UE1, the decryption keys extracted from the DRM message 70 can now be used to decode relevant content 81. The content 81 may be encrypted using more than one of the decryption keys. For example, where a service B01 includes a "bundle" of separate items and/or services S01, the various items and/or services S01 may be encrypted using different keys, and the corresponding decryption keys included in the DRM message 70. As the items form part of a single bundle B01, the items are encrypted so that the handset UE1 can then decode the relevant content 81 using the same RO 77. The handset UE1 cannot decode content from other fee-based services unless the RO for that particular service is also stored in the memory 12.

If the RO 77 was not received successfully at the handset UE1, or if the RO 77 becomes corrupted or is deleted unintentionally by a user, the handset UE1 will not be able to decode the content 81 relating to the chosen service. The subscription information saved in the secure part of memory 12 can be used by the handset UE1 to distinguish between a situation the content cannot be decoded due to corruption or absence of the RO 77 and a situation where the content relates to a service that the handset UE1 is not entitled to access. If the subscription information indicates that the handset UE1 should be able to decode the content, the handset UE1 automatically sends a message to the IP sender 24, requesting that the RO 77 be re-transmitted. A lost or corrupted RO 77 can therefore be replaced without repeating the request/registration procedure and, therefore, at no cost to the user.

Alternatively, a request message may be sent, requesting that the RO 77 is resent. Such a request message would include the authentication information 74, which may be automatically included, service identifier 61 and may further include a preferred response channel RC01 and/or a command or keyword, such as "RELOAD," indicating that the request relates to a RO 77. The subscription information may indicate that the user's subscription to the chosen service has expired. The handset UE1 may be configured so that, in this case, a message is automatically generated on, or shortly before, expiry, to notify the user. The message may request the user to confirm whether the subscription is to be renewed for another subscription period. In response to a positive indication, the handset UE1 may automatically generate and send a request message 71 to the ECS 32 to receive the service for the next subscription period. Alternatively, the user may have indicated that the subscription is to be automatically renewed when subscribing to the service, or may have otherwise entered into a contract whereby the subscription is automatically renewed.

The user may cancel their subscription to a service during a subscription period, by sending a further request message (not shown) to the ECS 32 via the PLMN 3. The request message would include the service identifier 61, authentication information 74 and, optionally, an end date 68. As in the request message 71, the authentication information 74 may be generated and incorporated in the further request message automatically, without requiring manual input from the user. The request message may also include a keyword, such as "CANCEL," indicating the type of request made. On receipt of the further request message, the record in the user database 36 and billing information 80 in the CDR database 40 are updated accordingly. Where appropriate, a refund based on the remainder of the subscription period is calculated and credited to the user through the billing mechanism described above. If required, the calculation of the refund may be partly or wholly based on the ESG data 69, such as the table shown in FIG. 9.

If a subscription is cancelled, the user may be prevented from continuing to access the service by sending a "dummy" RO, which replaces the previous RO 77. The "dummy" RO may be sent as an acknowledgement to the cancellation request and, when the user accepts a refund, the RO 77 is replaced with the "dummy" RO. The user may also send a request message, not shown, to the ECS 32 via the PLMN 3 in order to access their account information, which is stored in the user database 36. Such an information request message includes authentication information 74 and may further include a keyword or command, such as "ACCOUNT." As before, the authentication information 74 may be generated and incorporated in the further request message automatically, without requiring manual input from the user. In response to the information request, the user's account information is sent through the PLMN 3 to the handset UE1.

In another embodiment, a procedure for registering for, purchasing and/or subscribing to a service involves three participants: a service system, an ECS and a handset. The handset is capable of receiving IP streams through the broadcast network and capable of making purchase transaction using a mobile phone network. In such an embodiment, the service system is responsible for protecting the content, for example, by encrypting part or all of the content, producing Security Association (SA) files and DRM ROs associated with them. A list of sellable items, such as services S01, service components S02 or bundles B01, the ROs and information relating to mapping of sellable items to ROs are delivered to the ECS. The RO files may be delivered in one embodiment of the invention from the service system to the ECS via a http interface.

As in the embodiments described above, the ECS is responsible for distributing the ROs to the handset, compiling billing information and delivering it to an environment of the mobile network operator through which the handset accesses the PLMN. In the above described embodiments, the request message 71, RO 77 and notification message 79 etc., may be sent via the SMS gateway 44, WAP gateway 45 or e-mail gateway 46. However, the invention may be implemented so that the ECS 32 and handsets UE1, UE2 communicate using an MMS delivery mechanism. An MMS gateway, not shown, may be configured alongside, or instead of, one or more of the WAP gateway 45 and SMS gateway 44 shown in FIG. 6.

While the embodiments related to services broadcast over a DVB-T type network 2, the invention may be implemented in systems including other networks, for example, networks according to DVB-S, DVB-H, Integrated Services Digital Broadcasting (ISDB) or Advanced Television Standards Committee (ATSC) standards. Furthermore, the invention has been described by way of an example in which IPDC services are provided to mobile telephone handsets UE1, UE2. However, the invention may be used in the distribution of content and digital rights to personal digital assistants (PDAs), laptop computers or other devices configured to receive data from a digital broadcast network and to send and receive data via a second, bi-directional, network in addition to, or instead of, mobile telephone handsets UE1, UE2.

The invention claimed is:

1. A receiving device comprising:
   a receiver configured to receive broadcast data and information of available services from a broadcast network;
   a transceiver configured to send and receive data over a second network different from the broadcast network;
   a processor configured to
   generate a request via the second network for access to the broadcast data,
   decode the broadcast data received from the broadcast network with a decryption key received from the broadcast network in conjunction with a rights object received from the second network,
   wherein the broadcast data cannot be decoded by the decryption key without the rights object, and
   wherein the request includes authentication information relating to the receiving device, and at least part of the information of the available services.

2. A receiving device according to claim 1, configured to provide authentication information by extracting the authentication information from a component of the receiving device.

3. A receiving device according to claim 2, wherein said component is a smart card.

4. A receiving device according to claim 1, configured to produce a request so that the authentication information is incorporated in the request by a network component of the second network, prior to delivery of the request to the destination.

5. A receiving device according to claim 1, wherein the authentication information is an IMEI or MSISDN number associated with the receiving device.

6. A receiving device according to claims 1, configured to receive a media guide further comprising descriptions of services available to the receiving device via the broadcast network.

7. A receiving device according to claim 6, configured to extract data relating to an available service from said media guide and include at least some of the extracted data in the request.

8. A receiving device according to claim 7, configured to extract from the media guide data relating to a communication channel for use in requesting access to data and to send the request via said communication channel.

9. A receiving device according to claim 8, configured to send the request using a delivery mechanism specified in the media guide.

10. A method comprising:
    receiving at a terminal information of available services over a broadcast network;
    generating at a terminal a request for access to broadcast data from the broadcast network;
    retrieving authentication information relating to the terminal from a source other than manual input;
    incorporating said authentication information and at least part of the information of the available services in said request;
    sending said request to a server via a second network, different from the broadcast network;
    receiving at the terminal one or more decryption keys from the broadcast network;
    receiving at the terminal one or more rights objects from the second network;
    receiving at the terminal the broadcast data associated with the request from the broadcast network; and
    decrypting the received broadcast data with one or more of said decryption keys in combination with said one or more rights objects, wherein the data cannot be decoded by the decryption key without a rights object.

11. A method according to claim 10, wherein said authentication information is retrieved from a smart card.

12. A method according to claim 10, wherein said authentication information is added to the request by a network component within the second network.

13. A method according to claim 10, wherein the authentication information is an IMEI or MSISDN number.

14. A method according to claim 10, further comprising receiving a media guide further comprising descriptions of services available via the broadcast network.

15. A method according to claim 14, further comprising extracting data relating to an available service from said media guide and including at least some of the extracted data in the request.

16. A method according to claim 15, further comprising extracting from the media guide data relating to a communication channel for use in requesting access to data, wherein the request is sent via said communication channel.

17. A method according to claim 10, wherein the request is sent using a delivery mechanism specified in the media guide.

18. A method according to claim 10, further comprising incorporating in a request message authentication information relating to a terminal.

19. An apparatus comprising:
    a server configured to generate a media guide comprising descriptions of services available over a broadcast network and forward data included in the media guide to an electronic commerce system;
    a transmitter configured to broadcast the media guide over the broadcast network;
    a gateway configured to receive a request for access to broadcast data from a terminal via a second network that is different from the broadcast network, said electronic commerce system further configured to extract authentication information relating to the terminal and service data corresponding to information in the media guide from the request;
    a processor configured to at least partially encrypt the broadcast data with one or more encryption keys, so that said broadcast data can only be decrypted by the terminal with one or more corresponding decryption keys in combination with one or more rights objects, wherein at least one of said decryption keys is available to the terminal, wherein the broadcast data cannot be decoded by the decryption key without the rights object;
    an interface configured to send the one or more rights objects via the second network to the one terminal; and
    a transmitter further configured to broadcast the encrypted broadcast data and the one or more decryption keys over the broadcast network.

20. An apparatus according to claim 19, wherein the transmitter is configured to transmit at least one of the decryption keys over the broadcast network.

21. An apparatus according to claim 19, further comprising a rights object generation module configured for generating at least one of the one or more rights objects.

22. An apparatus according to claim 19, wherein the electronic commerce system is configured to:
  extract from the request service data corresponding to the media guide data; and
  compare the extracted service data with the media guide data received from the server.

23. An apparatus according to claim 22, wherein the electronic commerce system is configured to, in the event of a discrepancy, send a notification message to the terminal.

24. An apparatus according to claim 19, wherein said server is configured to generate a media guide that includes information identifying communication channels within the second network for use in requesting access to said services.

25. An apparatus according to claim 24, wherein said information identifying a communication channel specifies a delivery mechanism applicable in that communication channel.

26. A method comprising:
  generating a media guide comprising descriptions of services available over a broadcast network;
  broadcasting the media guide over the broadcast network;
  receiving a request for access to broadcast data from a terminal via a second network that is different from the broadcast network;
  extracting from the request authentication information relating to the terminal and service data corresponding to information provided in the media guide;
  comparing the extracted service data with the media guide information in order to detect discrepancies there between;
  encrypting the broadcast data at least partially with one or more encryption keys, so that said broadcast can only be decrypted by the terminal with one or more corresponding decryption keys in combination with one or more rights objects, wherein said one or more decryption keys are available to the terminal, wherein the broadcast data cannot be decoded by the decryption key without the rights object;
  sending the one or more rights objects via the second network to the one terminal; and
  broadcasting the encrypted broadcast data and said one or more decryption key over the broadcast network.

27. A method according to claim 26, wherein, when the media guide is broadcast, information from said media guide is forwarded to request handling means, where the request handling means perform the steps of extracting service data and comparing service data with media guide information.

28. A method according to claim 27, comprising:
  generating an updated media guide; and
  broadcasting the updated media guide.

29. A method according to claim 28, wherein, when the updated media guide is broadcast, information from said updated media guide is forwarded to the request handling means.

30. A method according to claim 26, further comprising, in the event of a detection of a discrepancy, sending a notification message to the terminal.

31. A method according to claim 30, wherein the notification message specifies whether the media guide information is to take precedence over the extracted service data.

32. A method according to claim 26, further comprising broadcasting at least one of the one or more decryption keys over the broadcast network.

33. A method according to claim 26, further comprising generating at least one of the one or more rights objects.

34. A method according to claim 26, wherein the step of generating the media guide further comprises including information identifying communication channels within the second network for use in requesting said services.

35. A method according to claim 34, wherein the information identifying a communication channel specifies a delivery mechanism used in that communication channel.

36. An apparatus comprising:
  a server configured to generate a media guide comprising information of services available over a broadcast network, including an indication of one or more communication channels to be used for requesting access to broadcast data from said services, together with metadata describing said communication channels;
  a transmitter configured to broadcast the media guide over the broadcast network;
  a gateway configured to receive a request for access to the broadcast data from a terminal from one of said communication channels via a second network that is different from the broadcast network;
  a processor configured to encrypt at least partially the broadcast data with one or more encryption keys, so that said broadcast data can only be decrypted by the one terminal with one or more corresponding decryption keys in combination with one or more rights objects, wherein at least one of said decryption keys is available to the terminal, wherein the broadcast data cannot be decoded by the decryption key without the rights object;
  an interface configured to send the one or more rights objects via the second network to the one terminal; and
  wherein the request for access to the broadcast data includes authentication information relating to the terminal and at least part of the information corresponding to the services available in the media guide:
  the transmitter further configured to broadcast the encrypted data and the one or decryption keys over the broadcast network.

37. An apparatus according to claim 36, wherein the server is configured so that the metadata relating to a communication channel specifies a delivery mechanism to be used for requests made through that channel.

38. An apparatus according to claim 36, wherein the server is configured so that more than one communication channel may be associated with a service.

39. An apparatus according to claim 36, wherein the server is configured to generate a media guide in the form of an XML file.

40. A receiving device comprising:
  a receiver configured to receive broadcast data and media guide comprising information of available services from a broadcast network;
  a transceiver configured to send and receive data over a communication channel different from the broadcast network;
  a processor configured to extract information from the media guide received over the broadcast network, generate a request for access to the broadcast data wherein the request includes authentication information relating to the receiving device, transmit the request via the communication channel, wherein said communication channel is specified by the extracted information, decode the broadcast data received from the broadcast network with a decryption key received from the broadcast network in conjunction with a rights object received from the second network, wherein the broadcast data cannot be decoded by the decryption key without the rights object.

41. A receiving device according to claim 40, configured to forward the request using a delivery mechanism specified by the extracted information.

42. A receiving device according to claim 40, configured so that, in the event that the extracted information specifies more than one communication channel, to select one of said communication channels according to one or more predetermined criteria.

43. A receiving device according to claim 40, configured so that, in the event that the extracted information specifies more than one communication channel, to select one of said communication channels according to a preference indicated by a user of the receiving device.

44. A method comprising:
generating a media guide comprising information of services available over a broadcast network, including an indication of one or more communication channels to be used for requesting access to broadcast data from said services, together with metadata describing said communication channels;
transmitting the media guide to the terminals over the broadcast network;
receiving a request for access to broadcast data from a one terminal from one of said communication channels via a second network that is different from the broadcast network;
sending one or more rights objects associated with the requested data via the second network to the one terminal, wherein the broadcast data can only be accessed by the one terminal using a decryption key that is available to the one terminal in combination with one or more of said rights objects, wherein the broadcast data cannot be decoded by the decryption key without the rights object; and
broadcasting the encrypted data and the one or more decryption keys over the broadcast network;
wherein the request for access to the broadcast data includes authentication information relating to the terminal and at least part of the information corresponding to the services available in the media guide.

45. A method according to claim 44, wherein the media guide is generated so that the metadata relating to a communication channel specifies a delivery mechanism to be used for requests made through that channel.

46. A method according to claim 44, wherein more than one communication channel is associated with a service.

47. A method according to claim 44, wherein the media guide is generated in the form of an XML file.

48. A communication system comprising:
a broadcast network;
a second network, different from the broadcast network;
one or more terminals;
a server configured to generate a media guide comprising information of services available over the broadcast network and forward data included in the media guide to an electronic commerce system;
a gateway configured to receive a request for access to broadcast data from a requesting one of the one or more terminals via the second network, said electronic commerce system further configured to extract authentication information relating to the requesting terminal and service data corresponding to information in the media guide from the request;
a processor configured at least partially encrypt the broadcast data with one or more encryption keys, so that said broadcast data can only be decrypted by the requesting terminal with one or more corresponding decryption keys in combination with one or more rights objects, wherein at least one of said decryption keys is available to the requesting terminal, wherein the broadcast data cannot be decoded by the decryption key without the rights object;
an interface configured to send the one or more rights objects via the second network to the requesting terminal; and
a transmitter configured to broadcast the media guide, the one or more decryption keys and the encrypted data over the broadcast network.

49. A communication system according to claim 48, wherein the one or more of said terminals is a receiving device, comprising
a receiver configured to receive data from the broadcast network;
a transceiver configured to send and receive data over the second network different from the broadcast network;
a processor configured to generate a request for access to data, decode data received from the broadcast network with a decryption key received from the broadcast network in conjunction with a rights object received from the second network, wherein the data cannot be decoded by the decryption key without the rights object, and generate a request for transmission via the second network, wherein the request includes authentication information relating to the receiving device, the authentication information being provided automatically.

50. A computer-readable storage medium containing program code that is executed by at least one processor for performing instructions, the instructions comprising:
receiving information of available services over a broadcast network;
generating at a terminal a request for access to data from the broadcast network;
retrieving authentication information relating to the terminal from a source other than manual input;
incorporating said authentication information and least part of the information of available services in said request;
sending said request to a request handler via a second network, different from the broadcast network;
receiving at the terminal one or more decryption keys from the broadcast network;
receiving at the terminal one or more rights objects from the second network;
receiving at the terminal the broadcast data associated with the request from the broadcast network; and
decrypting the received broadcast data with one or more of said decryption keys in combination with said one or more rights objects, wherein the broadcast data cannot be decoded by the decryption key without the rights object.

51. A computer-readable storage medium containing program code that is executed by at least one processor for performing instructions, the instructions comprising:
generating a media guide comprising information of service data over a broadcast network;
broadcasting the media guide over the broadcast network;
receiving a request for access to broadcast data from a terminal via a second network that is different from the broadcast network, wherein the request includes authentication information relating to the terminal and at least part of the information of the service guide;
extracting from the request service data corresponding to information provided in the media guide;
comparing the extracted service data with the media guide information in order to detect discrepancies there between;

encrypting the broadcast data at least partially with one or more encryption keys, so that said broadcast data can only be decrypted by the terminal with one or more corresponding decryption keys in combination with one or more rights objects, wherein said one or more decryption keys are available to the terminal, wherein the broadcast data cannot be decoded by the decryption key without the rights object;

sending the one or more rights objects via the second network to the one terminal; and broadcasting the encrypted broadcast data and the one or more decryption keys over the broadcast network.

52. A computer-readable medium storage containing program code that is executed by at least one processor for performing instructions, the instructions comprising:

generating a media guide comprising information of services available over a broadcast network, including an indication of one or more communication channels to be used for requesting access to data from said services, together with metadata describing said communication channels;

transmitting the media guide to the terminals over the broadcast network;

receiving a request for access to broadcast data from a terminal from one of said communication channels via a second network that is different from the broadcast network, wherein the request includes authentication information relating to the terminal and at least part of the information of services available;

sending one or more rights objects associated with the requested data via the second network to the one terminal, wherein the broadcast can only be accessed by the one terminal with a decryption key that is available to the one terminal in combination with one or more of said rights objects, wherein the broadcast data cannot be decoded by the decryption key without the rights object; and broadcasting the encrypted data and the one or more decryption key over the broadcast network.

53. A user terminal comprising:

a processor configured to:

receive information of available services over a broadcast network generate a request for access to broadcast data from the broadcast network;

retrieve authentication information relating to the terminal from a source other than manual input;

incorporate said authentication information and least part of information of available services in said request;

send said request to a server via a second network, different from the broadcast network;

receive one or more decryption keys from the broadcast network;

receive one or more rights objects from the second network;

receive the broadcast data associated with the request from the broadcast network; and decrypt the received broadcast data with one or more of said decryption keys in combination with said one or more rights objects, wherein the broadcast data cannot be decoded by the decryption key without a rights object.

54. The user terminal of claim 53, further comprising a memory coupled to the processor, wherein the memory includes program code executable by the processor.

55. A method, comprising:

receiving broadcast data from a broadcast network;

sending and receiving data over a second network different from the broadcast network;

generating a request for access to broadcast data;

decoding broadcast data received from the broadcast network with a decryption key received from the broadcast network in conjunction with a rights object received from the second network, wherein the broadcast data cannot be decoded by the decryption key without the rights object; and extracting information from a media guide received over the broadcast network to generate the request and to transmit the request via a communication channel, wherein said communication channel is specified by the extracted information; and wherein the request includes authentication information relating to a requesting terminal and at least part of the extracted information.

* * * * *